No. 648,140. Patented Apr. 24, 1900.
H. J. ASHLEY.
HARNESS SADDLE.
(Application filed Aug. 8, 1898.)
(No Model.)

Witnesses:
Henry L. Dick.
Chas. F. Burkhart.

H. J. Ashley, Inventor.
By Wilhelm Bonner,
Attorneys.

UNITED STATES PATENT OFFICE.

HARMON J. ASHLEY, OF MACHIAS, NEW YORK.

HARNESS-SADDLE.

SPECIFICATION forming part of Letters Patent No. 648,140, dated April 24, 1900.

Application filed August 8, 1898. Serial No. 688,031. (No model.)

*To all whom it may concern:*

Be it known that I, HARMON J. ASHLEY, a citizen of the United States, residing at Machias, in the county of Cattaraugus and State of New York, have invented a new and useful Improvement in Harness-Saddles, of which the following is a specification.

This invention relates to that class of harness-saddles or saddletrees in which the pads are carried by swiveling plates pivoted to the yoke of the saddle for permitting the pads to adapt themselves to the horse's back.

The objects of my invention are to increase the strength of the hinge connections between the self-adjusting pads and the yoke and to securely attach the skirts and bearers to the yoke.

Figure 1:
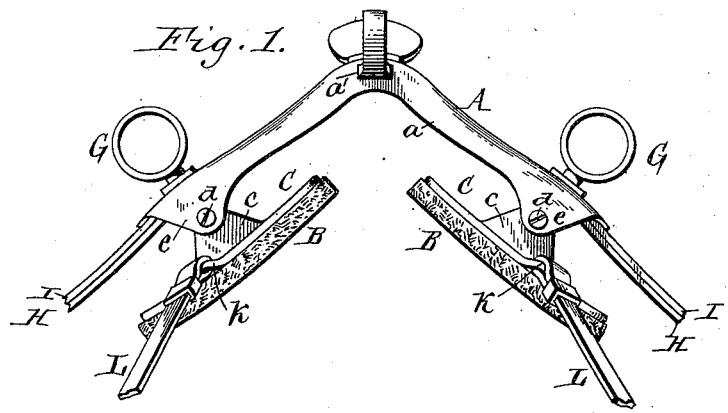
Figure 2:
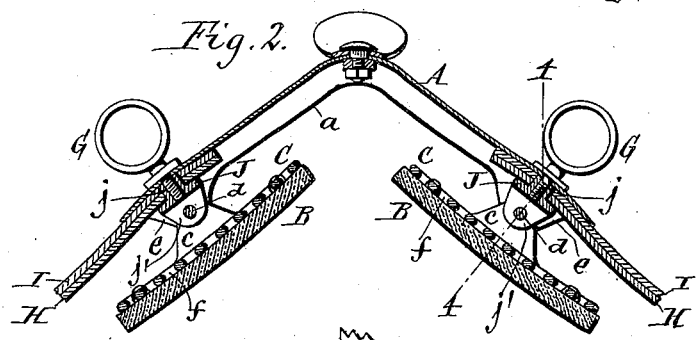
Figure 3:
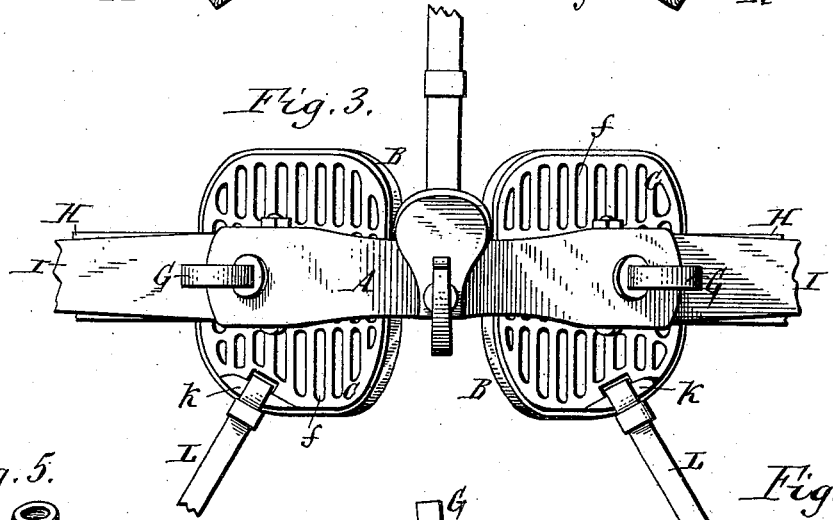
Figure 5:
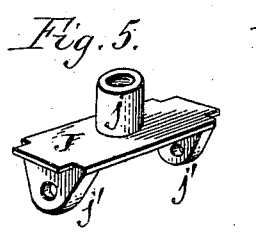
Figures 4, 6:
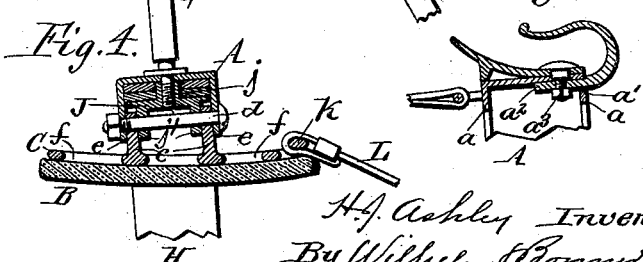

In the accompanying drawings, Figure 1 is a front elevation of my improved saddle. Fig. 2 is a longitudinal central section of the same. Fig. 3 is a top plan view of the saddle. Fig. 4 is a transverse section thereof in line 4 4, Fig. 2. Fig. 5 is a detached perspective view of one of the clamping devices for fastening the skirts and bearers to the saddle. Fig. 6 is a transverse central section of the yoke.

Like letters of reference refer to like parts in the several figures.

A is the metallic yoke, which is preferably provided at its longitudinal edges with depending flanges $a$ for stiffening the same. These flanges extend along the crown as well as the side portions of the yoke, so as to brace the yoke at the crown and resist its tendency to flatten at this point. The front flange of the yoke is provided at the crown and above its lower edge with an opening $a'$, through which the shank $a^2$ of the check-hook passes, as shown in Fig. 6, the shank bearing against the under side of the crown and being secured thereto by the usual bolt $a^3$. By passing the shank of the check-hook through the opening $a'$ the hook is more rigidly fastened to the yoke, and by extending the flange $a$ below this opening, as shown, the flange conceals the nut of the bolt $a^3$ and forms a guard which prevents the nut from bearing upon the horse's back.

B represents the saddle-pads, of felt or other suitable material, and C the pivoted or self-adjusting plates to which the pads are applied. These plates are hinged to the end portions of the yoke by transverse pins or bolts $d$, passing through ears $c$, formed centrally on the upper or rear side of the pad-plates, and through similar ears $e$, formed on the marginal flanges of the yoke, the ears of the pad-plates being preferably arranged on the inner side of the yoke-ears, as shown in Figs. 1 and 4. This hinged connection permits the pad-plates to swivel transversely of the saddle for adjusting themselves to the back of the horse. The pad-plates are preferably provided over their entire area with ventilating slots or apertures $f$ for allowing heat and moisture to escape from the pads. These apertures also reduce the weight of the pad-plates. The plates are provided with a smooth face or lower side and are preferably made of malleable iron, so that they can be bent to fit the conformation of the horse's back.

G represents the terrets, H the skirts, and I the bearers. The skirts and bearers are arranged under the end portions of the yoke and secured thereto independently of the swiveling pad-plates, as shown. By thus avoiding all connection of the pad-plates with the bearers and skirts the pads are perfectly free to adjust themselves to the horse's back, so as to bear squarely upon the same over their entire surface instead of bearing only with their outer portions or edges, which is liable to be the case when the bearers and skirts are attached to the outer ends of the pad-plates, thereby obviating the chafing and discomfort experienced by the animal by said objectionable construction.

The skirts and bearers are preferably secured to the yoke by the terrets G and clamping-plates J, which bear against the under side of the skirts, so as to confine the latter and the bearers between the yoke and the clamping-plates. Each of these clamping-plates is provided on its upper side with a hollow internally-screw-threaded stud or nipple $j$, which passes through openings formed in the skirt and the bearer and with which the externally-screw-threaded shank of the terret engages, as shown in Figs. 2 and 4, thereby retaining the stud of the clamping-plate in the openings of the skirt and bearer and securely attaching these parts to the yoke. Each clamping-plate is also provided with depending perforated ears $j'$, through which the pivot-bolt $d$ passes and which bear against the inner sides of the ears $c$ of the pad-plate, as shown in Fig. 4. By this construction the ears of the pad-plate are confined between the ears $e$ of the yoke and the ears $j'$ of the clamping-plate J, producing a strong hinge connection for the pad-plates which effectually prevents the plates from twisting on the yoke.

Each pad-plate is preferably provided at or near its front edge with a loop $k$ for the attachment of a pair of neck-straps L, which extend downwardly and forwardly from the plates and are secured at their lower ends to the breast-collar of the harness for sustaining the collar, which latter is not shown in the drawings. These loops are arranged about in line with the pivots of the pad-plates, so that the neck-straps $k$ do not restrain or interfere with the freedom of motion of the pad-plates.

I claim as my invention—

The combination with the yoke, of a self-adjusting pad-plate pivoted to the yoke by a bolt or pin passing through ears formed on said parts, a strap such as a skirt or bearer, arranged on the under side of the yoke, a clamping-plate provided on its upper side with a hollow internally-screw-threaded stud which enters the opening of said strap and on its under side with depending perforated ears which receive said pivot pin or bolt and are arranged on the inner sides of the ears of said pad-plate, and a terret having a screw-threaded shank which passes through the yoke and engages with said stud, substantially as set forth.

Witness my hand this 29th day of July, 1898.

HARMON J. ASHLEY.

Witnesses:
CARL F. GEYER,
KATHRYN ELMORE.